United States Patent [19]

Peters

[11] E Re. 30,998

[45] Reissued Jul. 20, 1982

[54] HOT GOB DETECTOR FOR CONTROLLING A GLASSWARE FORMING MACHINE

[75] Inventor: Homer D. F. Peters, Sylvania, Ohio

[73] Assignee: Owens-Illinois, Inc., Toledo, Ohio

[21] Appl. No.: 288,252

[22] Filed: Jul. 30, 1981

Related U.S. Patent Documents

Reissue of:

[64] Patent No.: 4,162,909
Issued: Jul. 31, 1979
Appl. No.: 856,473
Filed: Dec. 1, 1977

[51] Int. Cl.[3] ..... C03B 9/40

[52] U.S. Cl. ..... 65/163; 65/29; 65/159; 65/164; 65/DIG. 13; 364/473; 364/476

[58] Field of Search ..... 65/29, 158, 159, 160, 65/163, 164, DIG. 13; 364/473, 476

[56] References Cited

U.S. PATENT DOCUMENTS

| | | | |
|---|---|---|---|
| 3,184,725 | 5/1965 | Siegel et al. | 65/DIG. 13 |
| 3,502,457 | 3/1970 | Bublitz et al. | 65/161 |
| 3,574,587 | 4/1971 | Grundy et al. | 65/159 X |
| 3,762,907 | 10/1973 | Quinn et al. | 65/164 |
| 3,957,477 | 5/1976 | Jones et al. | 364/476 X |
| 3,988,139 | 10/1976 | Goodwin | 65/162 |
| 3,998,616 | 12/1976 | Farabaugh | 65/29 |
| 4,007,028 | 2/1977 | Bublitz et al. | 65/163 |
| 4,108,623 | 8/1978 | Cardenas-Franco | 65/29 X |

*Primary Examiner*—Arthur D. Kellogg
*Attorney, Agent, or Firm*—David H. Wilson; Myron E. Click

[57] ABSTRACT

An apparatus for detecting the presence of a gob of molten glass as it enters a cavity in the mold of an automatic glassware forming machine. The detector includes a phototransistor sensor and circuitry for generating a gob detection signal. Two or more detectors can be combined to generate a signal indicating that the last gob has entered a multi-cavity mold so that the forming process can begin. The gob detection signal can also be utilized to adjust the timing of the glassware forming process for differences in the travel time between the gob forming apparatus and the mold.

16 Claims, 5 Drawing Figures

HOT GOB DETECTOR FOR CONTROLLING A GLASSWARE FORMING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the detection of gobs of molten glass entering molds in glassware forming machines.

2. Description of the Prior Art

In a glassware forming machine known as an IS or individual section machine, each individual section includes a plurality of means for performing a predetermined sequence of steps in a timed relationship to form the glassware. The forming means generally have been powered by pneumatic motors controlled by a valve block which, in turn, is controlled by a rotating timing drum. Glass is melted and formed into gobs which are guided to the individual sections by a gob distributor. Each section of the machine produces glassware from the gobs which glassware is placed on a dead plate for push out onto a flight conveyor. The conveyor removes the glassware to a lehr for annealing and cooling and any other treatment.

The individual sections are operated in a predetermined sequence at a relative phase difference to receive gobs from the gob distributor in ordered sequence. As one of the sections is receiving a gob from the gob distributor, another one of the sections is delivering a finished article of glassware to the conveyor and the other sections are performing various ones of the forming steps. Furthermore, two molds can be provided in each section whereby a gob is received in a first mold, called a blank or parison mold, for the initial process of forming a parison, followed by transfer of the parison to a second mold, called a blow mold, for final blowing of the article. Since each mold can have more than one cavity, each section of the machine is operating simultaneously upon a plurality of gobs to form the glassware articles.

Whether the timing drum or an electronic control system is utilized to define the timing of the sections, the prior art has synchronized the section timing with the timing of the gob feeder and the gob distributor. Not only were the sections operated at relative phase differences to receive the gobs in ordered sequence, but the phase differences had to be pre-adjusted for differences in the travel time of the gobs to the individual sections which are typically located in a line along the conveyor wherein no more than two sections might be the same given distance from the gob feeder.

SUMMARY OF THE INVENTION

The present invention concerns an apparatus for detecting the presence of a gob of molten glass as it enters a mold in a glassware forming machine. The hot gob emits radiation in the visual to infrared spectrum which is sensed by a phototransistor. The phototransistor responds by generating an electrical signal which is compared with the magnitude of a threshold voltage to generate a detection signal. The detection signal can then be utilized to adjust the timing of the individual section according to the actual arrival of the gob at the mold rather than according to the time of formation of the gob plus the estimated travel time to the mold as was done in the prior art. Where the mold includes two or more cavities the detection signals from a separate detector for each cavity can be NAND'ed to indicate when the last gob has arrived.

It is an object of the present invention to increase the efficiency of a glassware forming machine by timing the glassware forming cycle from the actual arrival of the gob of molten glass at the mold.

It is another object of the present invention to increase the efficiency of a glassware forming machine by timing the glassware forming cycle from the detection of the last gob of molten glass to enter a multi-cavity mold.

It is a further object of the present invention to increase the efficiency of an individual section glassware forming machine by adjusting the phase differences between the timing cycles of the sections for the actual arrival of the gobs of molten glass at the molds.

DESCRIPTION OF THE PREFERRED EMBODIMENT

Figure 1:
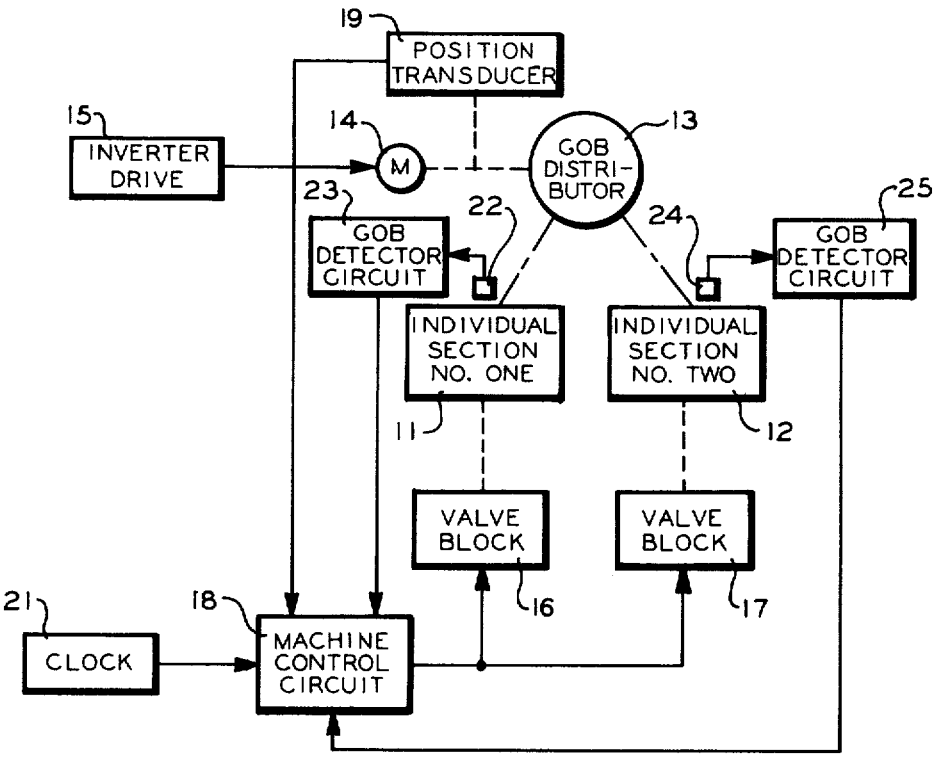
FIG. 1 is a block diagram of a two section IS machine including gob detectors according to the present invention.

There is shown in FIG. 1 a block diagram of a two section glassware forming machine including gob detectors according to the present invention. An individual section No. One 11 and an individual section No. Two 12 each receive gobs of molten glass from a gob distributor 13 which in turn receives the gobs from a gob feeder (not shown). The gob distributor 13 is mechanically driven by a drive motor 14 which is connected to a supply of variable frequency power generated by an inverter 15. The gob feeder is driven in a similar manner. The inverter drive frequency is controlled to determine the rate at which the gobs are formed and distributed to the individual sections 11 and 12.

The individual sections 11 and 12 are associated with separate valve blocks 16 and 17 respectively. Each valve block has valves connected to actuate a plurality of glassware forming means in the associated individual section. The valves in the valve blocks are actuated by solenoids which are controlled by a machine control circuit 18 which determines the timing of the forming steps in accordance with a predetermined sequence of those steps. The control circuit 18 receives information as to the sequence of the steps and the times between the steps from a source (not shown) such as control switches or a computer program. A position transducer 19 is mechanically coupled to the drive motor 14 and generates signals representing the relative position of the gob distributor 13. A similar position transducer (not shown) is provided for the gob feeder. Since the forming of the gob is related to the rotational position of the gob feeder drive motor and the distribution of any one gob is related to the rotational position of the gob distributor drive motor, the respective position transducers generate signals indicating when a gob is formed and to which section it is distributed.

The machine control circuit also receives a clock signal from a source 21 which signal provides a reference for timing the machine cycle and the sequence of steps. Typically, machine timing is expressed in degrees and a machine cycle is 360° in length. The cycle for each section is also 360° but the cycles for the sections will be offset from the start of the machine cycle by different numbers of degrees to compensate for the difference in gob delivery time to each section. A glassware forming apparatus as shown in FIG. 1 is more fully described in U.S. Pat. No. 4,007,028 issued Feb. 8, 1977 to A. T. Bublity, et al.

There is also shown in FIG. 1 a gob sensor 22 and an associated gob detector circuit 23 according to the present invention. The gob sensor 22 is positioned adjacent the path of travel between the gob distributor 13 and the individual section No. One and near the opening of the mold (not shown). As a gob arrives at the mold, the sensor 22 responds to the presence of the gob by generating a sensor signal to the gob detector circuit 23. The detector circuit compares the magnitude of the sensor signal with the magnitude of a threshold signal to generate a detection signal to the machine control circuit 18 when a gob is sensed. The control circuit 18 then can adjust the start of the individual section No. One glassware forming cycle with respect to the machine cycle for the arrival of the gob at the mold. A gob sensor 24 and a gob detector circuit 25 are provided for the individual section No. Two to adjust the start of the glassware forming cycle for that section in a similar manner.

Figure 2:
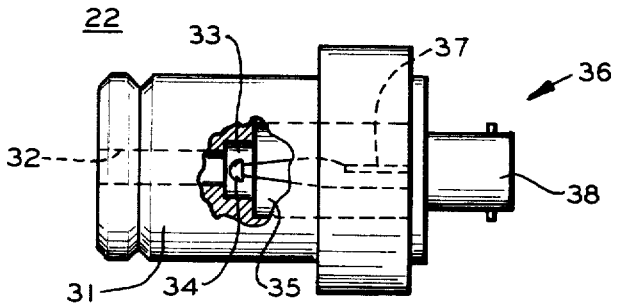
FIG. 2 is a plan view of one of the gob sensors of FIG. 1.

There is shown in FIG. 2 a plan view of the gob sensor 22 of FIG. 1 in partial cut away to expose a phototransistor. The gob sensor 22 includes a housing 31 having a first longitudinal aperture 32 forming therein connecting one end of the housing with a central cavity 33. A phototransistor 34 is mounted in the cavity 33 adjacent the internal end of the aperture 32. A second longitudinal aperture 35 is formed in the housing 31 and connects the cavity 33 with the other end of the housing 31. A standard female BNC connector 36 is attached to the housing 31 at the external end of the aperture 35 and has a central pin 37 which extends into the aperture 35. The photo transistor 34 has a pair of leads, a collector lead and an emitter lead, which are connected to the BNC connector 36, the collector lead to the pin 37 and the emitter lead to a shell 38. The aperture 35 is larger in diameter than either the aperture 32 or the cavity 33 for ease of assembly of the leads to the BNC connector 36 before the connector is attached to the housing 31.

Typically, the housing 31 is formed of a non-conductive material such as a phenolic material. The light sensitive base of the photo transistor 34 is positioned to face along the longitudinal axis of the aperture 32 such that the aperture forms a "window" through which the phototransistor "sees" the passing hot gob of molten glass. Typically, the aperture 32 is one-eighth inch in diameter and one-half inch in length to restrict the view thereby making the phototransistor more sensitive such that the leading edge of the gob is sharply detected and to provide some protection from airborne foreign matter produced by the glassware forming process. However, since a source of pressurized air for operating the pneumatic motors of the machine is available, this source could be utilized to provide a stream of air for purging the aperture 32.

Figure 3:
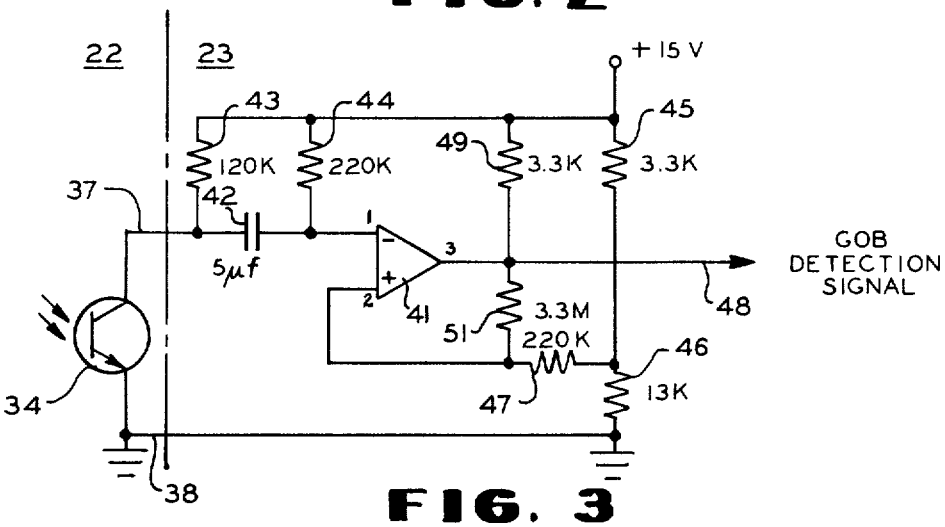
FIG. 3 is a schematic of the gob detector according to the present invention.

There is shown in FIG. 3 a schematic diagram of the gob sensor 22 and the gob detector circuit 23 of FIG. 1. The collector of the phototransistor 34 is connected to the pin 37 of the BNC connector which in turn is connected to an input 41-1 of a comparator 41 through a capacitor 42. The emitter of the phototransistor is connected to the shell 38 which in turn is connected to the system ground potential. A resistor 43 is connected between a positive polarity power supply (not shown) and the pin 37 to limit current flow through the phototransistor 34. A resistor 44 is connected between the power supply and the input 41-1. A second input 41-2 of the comparator 41 is connected to the junction of a pair of resistors 45 and 46 through a current limiting resistor 47. The resistors 45 and 46 are connected between the power supply and the ground potential. An output 41-3 of the comparator 41 is connected to a gob detection signal output line 48, to the power supply through a resistor 49 and to the input 41-2 through a resistor 51.

When there is no gob present, the phototransistor 34 is turned off and both sides of the capacitor 42 will be at the power supply voltage which is also applied to the input 41-1. The resistors 45 and 46 function as a voltage divider to generate a threshold voltage at the input 41-2. If the input 41-1 is the inverting input and the input 41-2 is the non-inverting input, the comparator 41 will generate a signal at or near the system ground potential since the magnitude of the power supply voltage at the input 41-1 is greater than the magnitude of the threshold voltage at the input 41-2. When the gob is detected, the phototransistor 34 will be turned on to place its collector near the system ground potential. Since the voltage across a capacitor cannot change instantaneously, the input 41-1 will also be near the system ground potential. Thus, the comparator 41 will change its output signal to the power supply voltage and the resistor 49 will provide a current path for driving circuitry connected to the output line 48 at the power supply voltage.

While the gob is passing the sensor 22, the capacitor 42 will charge toward the power supply voltage through the resistor 44 to insure that the comparator will switch back to the signal at or near the system ground potential. However, the length of time that the gob is passing the detector is typically less than the charging time constant for the capacitor 42. Therefore, the phototransistor 34 is turned off at the lagging edge of the gob and the magnitude of the signal of the input 41-1 once again exceeds the magnitude of the threshold signal to switch the comparator output. Thus, the gob detection signal generated on the line 48 is in the form of a square wave pulse having a magnitude at or near the power supply voltage and a duration determined by the time required for the gob to pass the sensor "window". The resistor 47 and the resistor 51 provide positive feedback to the input 41-2 creating a deadband between the voltage levels at which the comparator 41 switches output states. This deadband, or hysteresis, prevents any oscillation which may develop during a transistion between output states.

In the circuit of FIG. 3, the phototransistor 34 can be a TI-L66 available from Texas Instruments, and the comparator 41 can be an LM 339 available from National Semiconductor. Typical values for the circuit components are 120 K ohms for the resistor 43, 220 K ohms for the resistors 44 and 47, 3.3 M ohms for the resistors 45 and 49, 13 K ohms for the resistor 46, 3.3 M ohms for the resistor 51 and 5 microfarads for the capacitor 42. The positive polarity power supply is typically 15 volts.

Figure 4:
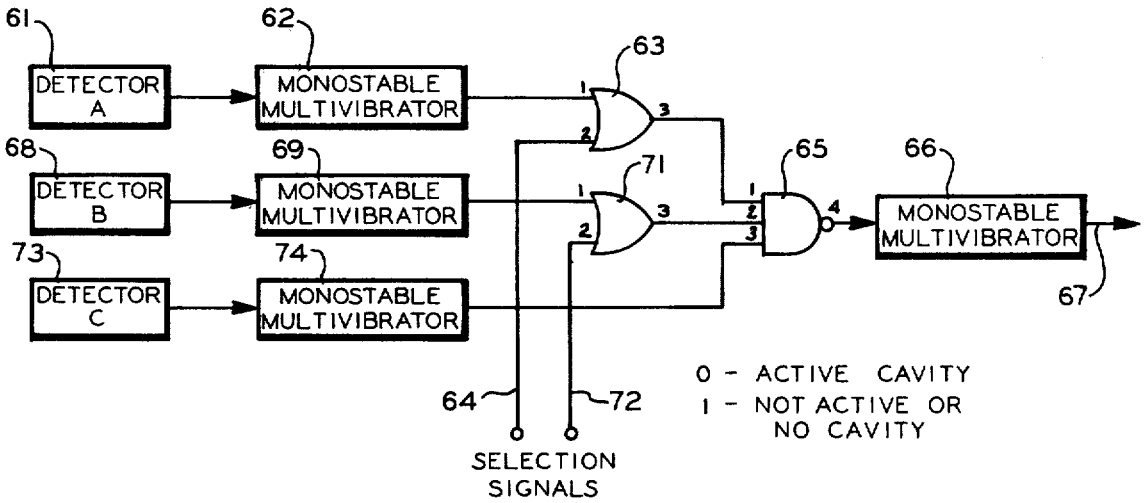
FIG. 4 is a schematic of a multi-cavity gob detector circuit according to the present invention.

There is shown in FIG. 4 a schematic diagram of a multi-cavity gob detector circuit according to the present invention. A detector A 61 represents a gob sensor and gob detector circuit such as is shown in FIG. 3. The gob detection square wave pulse generated by the detector A is an input to a monostable multivibrator 62. The multivibrator 62 responds to a "1" to "0" signal transistion such as the lagging edge of the gob detection pulse, by generating a square wave pulse of a predetermined duration to an input 63-1 of an OR 63. The OR 63 will generate a "0" at an output 63-3 if both of a pair of inputs 63-1 and 63-2 are at "0" and will generate a "1" at the output 63-3 if one or both of the inputs is at "1." The input 63-2 is connected to a selection line 64 and the output 63-3 is connected to an input 65-1 of a NAND 65. The NAND 65 will generate a "0" if all of its inputs are at "1" and will generate a "1" for all other input signal combinations. The output 65-4 is connected to an input of a monostable multivibrator 66 having an output connected to a last gob detection signal output line 67.

A detector B 68, similar to the detector A, has an output connected to an input of a monostable multivibrator 69 having an output connected to an input 71-1 of an OR 71. The OR 71 has an input 71-2 connected to a selection line 72 and an output 71-3 connected to an input 65-2 of the NAND 65. A detector C 73, also similar to the detector A, has an output connected to an input of a monostable multivibrator 74 having an output connected to an input 65-3 of the NAND 65.

The circuit of FIG. 4 is suitable for use with a one, two or three cavity mold. It will be appreciated that this circuit can be expanded should the mold have more than three cavities. If the mold has three cavities, a "0" selection signal is applied to each of the selection lines 64 and 72 to enable the OR's 63 and 71 respectively. The "0" selection signals can be generated by any suitable means such as switches connected to the system ground potential or a computer. If no gob has been detected, all of the detector outputs will be at "0" as will the outputs of the associated monostable multivibrators such that a "0" will appear at the inputs to the NAND 65. Thus the NAND 65 is at state "1," and the monostable multivibrator 66 generates a "0" on the output line 67.

As each gob enters a cavity of the mold, the associated detector generates a square wave detection signal. The associated monostable multivibrator is triggered on the lagging edge of the gob and, if the duration of the multivibrator pulse exceeds the time between the detection of the lagging edge of the first gob to enter the mold and the lagging edge of the last gob to enter the mold, all of the inputs to the NAND 65 will be at "1" to change the signal at the output 65-4 from "1" to "0". When the multivibrator associated with the first gob to be detected times out, the associated one of the inputs to the NAND 65 will return to "0" and the output 65-4 will return to "1" to form a "0" square wave pulse. The multivibrator 66 responds to the leading edge of the "0" pulse to generate a "1" signal indicating that the lagging edge of the last gob to enter the mold has been sensed and all three gobs are in the mold.

If one of the mold cavities is not active, or the mold has only two cavities, the associated selection line can have a "1" signal applied thereto to generate a "1" at the associated input to the NAND 65 to enable the NAND 65 for the detection of gobs entering two cavities. If two of the mold cavities are not active or the mold has only one cavity, both of the selection lines 64 and 72 can have a "1" signal applied thereto to enable the NAND 65 to detect the gob entering the one cavity. The "1" selection signals can be generated by any suitable means such as switches connected to a positive polarity power supply or a computer.

Figure 5:
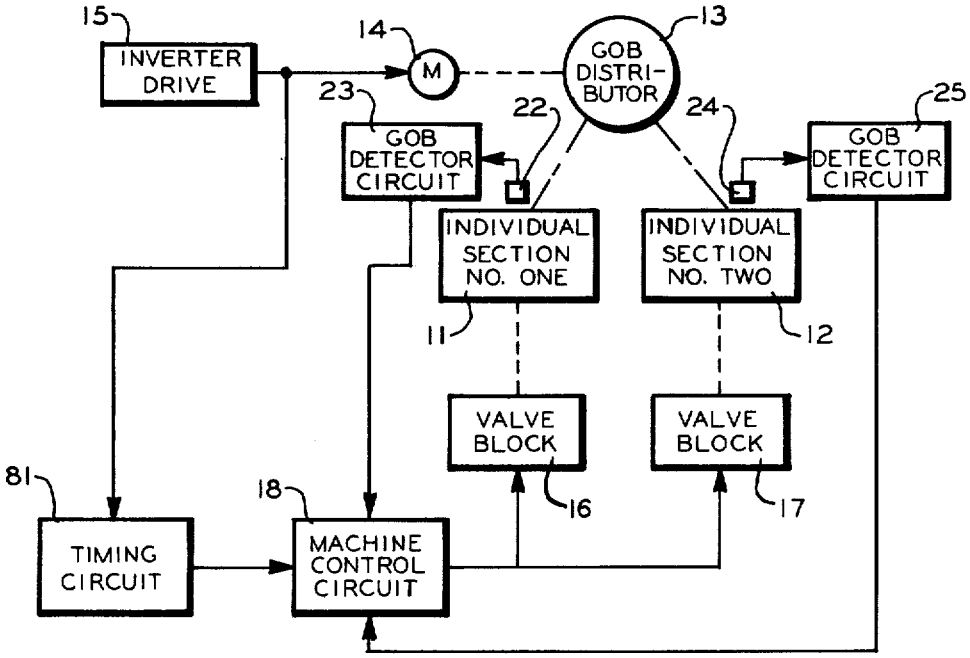
FIG. 5 is a block diagram of an alternate form of a two section IS machine including gob detectors according to the present invention.

There is shown in FIG. 5 a block diagram of an alternate form of two section IS machine including gob detectors according to the present invention. The elements labelled with the same reference numerals as used in FIG. 1 are similar to the corresponding elements of FIG. 1. However, the position transducer 19 of FIG. 1 has been eliminated and the clock 21 has been replaced by a timing circuit 81. The timing circuit 81 can be the timing circuit disclosed in U.S. patent application Ser. No. 856,387, or the timing circuit disclosed in U.S. patent application Ser. No. 860,934 both in the name of Daniel S. Farkas, et al. and assigned to the assignee of the present application. Therefore, the timing circuit 81 responds to the frequency of the inverter generated power to generate a timing signal to the machine control circuit 18 to synchronize the IS machine cycle with the gob distributor 13. For our example of a two section machine, the section cycles can be set at a 180° phase difference in the 360° machine cycle and the start of each section cycle can be adjusted to the actual arrival of a gob at the mold.

In summary, the present invention concerns a gob detection means for generating a detection signal in response to the presence of a gob of molten glass at the forming means in a glassware forming machine. The machine includes means for distributing gobs of molten glass at a predetermined rate from a source of the gobs; means for forming glassware articles in a timed, predetermined sequence of steps from the gobs received from the distributing means and control means responsive to the rate of gob distribution for cyclically controlling the actuation of the forming means in cycles of the timed, predetermined sequence of steps. The control means is responsive to the detection signal for starting the next cycle of the timed predetermined sequence of steps. Where the forming means includes a multi-cavity mold, a gob detection means is associated with each cavity and means responsive to the simultaneous generation of all of the detection signals generates a last gob detection signal to the control means for starting the next cycle.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. In a glassware forming machine including means for distributing gobs of molten glass at a predetermined rate from a source of the gobs; means for forming glassware articles in a timed, predetermined sequence of steps from the gobs received from the distributing means; means for generating timing signals; and control means responsive to the timing signals for cyclically controlling the actuation of the forming means in cycles of the timed, predetermined sequence of steps, the improvement comprising: a gob detection means responsive to the presence of a gob proximate the forming means for generating a time reference signal to the control means and wherein the control means includes means responsive to said time reference signal for adjusting the starting time of the subsequent forming cycle of the timed, predetermined sequence of steps.

2. A glassware forming machine according to claim 1 wherein said detection means includes a sensor means positioned adjacent the path of travel of the gobs between the distributing means and the forming means, said sensor means being responsive to the presence of each of the gobs for generating a sensor signal, and a gob detector circuit responsive to said sensor signal for generating said time reference signal.

3. A glassware forming machine according to claim 2 wherein said sensor means includes a phototransistor responsive to the light emitted by the gob for generating said sensor signal.

4. A glassware forming machine according to claim 2 wherein said gob detector circuit includes a source of a threshold signal and a comparator means responsive to the magnitudes of said sensor signal and said threshold signal for generating said time reference signal when the magnitude of said sensor signal exceeds the magnitude of said threshold signal.

5. A glassware forming machine according to claim 1 including a plurality of individual sections each having means for forming glassware articles in a timed, predetermined sequence of steps from the gobs received from the distributing means, the control means cyclically controlling the actuation of the forming means in cycles of the timed, predetermined sequence of steps, the cycles of any one of said plurality of individual sections being phased in time with respect to the cycles of any other one of said plurality of individual sections, wherein said detection means is responsive to the presence of a gob at the forming means of said any one individual section for generating said time reference signal and wherein said means responsive to said time reference signal adjusts the starting time of the next forming cycle of the timed, predetermined sequence of steps for said any one individual section.

6. A glassware forming machine according to claim 1 including a multi-cavity mold for forming the glassware articles; a plurality of gob detection means, one of said plurality of gob detection means associated with each of said cavities for generating said time reference signal in response to the presence of a gob at said associated cavity and means responsive to the generation of said time reference signals by all of said gob detection means for generating a signal to the control means indicating the presence of said gobs in all of said cavities and wherein said means responsive to said presence indicating signal adjusts the starting time of the next cycle of the timed, predetermined sequence of steps.

7. An apparatus for detecting the presence of a gob of molten glass at a mold in a glassware forming machine including a gob sensor means responsive to the light emitted by said gob for generating a sensor signal indicating the presence of said gob and a gob detector circuit having a source of a theshold signal and comparator means, said comparator means being responsive to said sensor signal and said threshold signal for generating a signal indicating the presence of said gob when the magnitude of said sensor signal [exceeds] *is less than* the magnitude of said threshold signal, and having means responsive to said comparator signal for increasing the magnitude of said threshold signal whereby said comparator terminates said comparator signal when the magnitude of said sensor signal [falls below] *exceeds* the increased magnitude of said threshold signal.

8. An apparatus according to claim 7 wherein said gob sensor means includes a phototransistor responsive to the light emitted from said gob for generating said sensor signal.

9. An apparatus according to claim 7 wherein said gob sensor means includes a phototransistor responsive to the light emitted from said gob for generating said sensor signal and a housing having a central cavity formed therein and an aperture formed therein connecting said central cavity with the exterior of said housing and wherein said phototransistor is mounted in said central cavity whereby said aperture forms a window to limit the view such that the leading edge of said gob is sharply detected.

10. An apparatus according to claim 9 wherein said aperture is approximately one-eighth inch in diameter by one-half inch in length.

11. An apparatus for indicating the presence of gobs in the cavities of a multi-cavity mold in a glassware forming machine including a first gob detector means positioned adjacent a first cavity of said mold for generating a first detection signal in response to the presence of a gob at said first cavity, a second gob detector means positioned adjacent a second cavity of said mold for generating a second detection signal in response to the presence of a gob at said second cavity and means responsive to the generation of said first and second detection signals for generating a signal indicating the presence of both said gobs in said first and second cavities.

12. An apparatus according to claim 11 wherein said presence indicating signal generating means includes means for generating a selection signal when said second cavity is not being used and said presence indicating signal generating means is responsive to said selection signal and said first detection signal for generating said presence indicating signal.

13. An apparatus according to claim 11 wherein said presence indicating signal generating means includes a first monostable multivibrator responsive to the lagging edge of said first detection signal for generating a first square wave pulse of a predetermined duration; a second monostable multivibrator responsive to the lagging edge of said second detection signal for generating a second square wave pulse of a predetermined duration; and means responsive to the coincidence of at least a portion of each of said first and second square wave pulses for generating said presence indicating signal.

14. An apparatus according to claim 11 wherein said presence indicating signal generating means includes a first monostable multivibrator responsive to the lagging edge of said first detection signal for generating a first square wave pulse of a predetermined duration; a second monostable multivibrator responsive to the lagging edge of said second detection signal for generating a second square wave pulse of a predetermined duration; an OR gate having one input connected to receive said second square wave pulse and another input connected to a source of a selection signal, said selection signal being generated as a "0" when said second cavity is active and as a "1" when said second cavity is inactive, said OR gate being responsive to the simultaneous generation of said second square wave pulse and said "0" selection signal for generating said second square wave pulse as an output signal and being responsive to said "1" selection signal for generating a "1" output signal;

and NAND means responsive to the simultaneous generation of said first square wave pulse by said first monostable multivibrator and said second square wave pulse or said "1" output signal by said OR gate for generating said presence indicating signal.

15. An apparatus for detecting the presence of a gob of molten glass at a mold in a glassware forming machine including a gob sensor means responsive to the light emitted by said gob for generating a sensor signal indicating the presence of said gob and a gob detector circuit having a source of a threshold signal and a comparator means, said comparator means being responsive to said sensor signal and said threshold signal for generating a signal indicating the presence of said gob when the magnitude of said sensor signal [exceeds] *is less than* the magnitude of said threshold signal, and means for terminating said comparator signal after a predetermined time period.

*16. An apparatus for detecting the presence of a gob of molten glass at a mold in a glassware forming machine including a gob sensor means responsive to the light emitted by said gob for generating a sensor signal indicating the presence of said gob, a gob detector circuit having a source of a threshold signal of a predetermined value, and a comparator means, said comparator means being responsive to the relative values of said sensor and said theshold signals and for generating a signal indicating the presence of said gob when the magnitude of said sensor signal changes from an initial value on one side of the predetermined value of said threshold signal to a second value on the other side of said predetermined threshold single value, and means for terminating said comparator signal after a predetermined time period.*

* * * * *